United States Patent
Xu et al.

(10) Patent No.: US 11,167,248 B2
(45) Date of Patent: *Nov. 9, 2021

(54) METHOD TO MAKE CARBON MOLECULAR SIEVE HOLLOW FIBER MEMBRANES

(71) Applicant: Dow Global Technologies LLC, Midland, MI (US)

(72) Inventors: Liren Xu, Spring, TX (US); Rahul Sharma, Pearland, TX (US); William J. Harris, Lake Jackson, TX (US); Mark K. Brayden, Baton Rouge, LA (US); Marcos V. Martinez, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/333,919

(22) PCT Filed: Sep. 25, 2017

(86) PCT No.: PCT/US2017/053153
§ 371 (c)(1),
(2) Date: Mar. 15, 2019

(87) PCT Pub. No.: WO2018/089114
PCT Pub. Date: May 17, 2018

(65) Prior Publication Data
US 2019/0275471 A1 Sep. 12, 2019

Related U.S. Application Data

(60) Provisional application No. 62/420,285, filed on Nov. 10, 2016.

(51) Int. Cl.
*B01D 67/00* (2006.01)
*B01D 53/22* (2006.01)
(Continued)

(52) U.S. Cl.
CPC ....... *B01D 67/0067* (2013.01); *B01D 53/228* (2013.01); *B01D 67/0009* (2013.01);
(Continued)

(58) Field of Classification Search
CPC .......... B01D 67/0067; B01D 2053/224; B01D 2256/12; B01D 2256/16; B01D 2256/24;
(Continued)

(56) References Cited

U.S. PATENT DOCUMENTS 4,113,628 A 9/1978 Alegranti
4,127,625 A 11/1978 Katsuharu et al.
(Continued)

FOREIGN PATENT DOCUMENTS

EP 459623 B1 6/1994
WO 2013165866 A1 11/2013
(Continued)

OTHER PUBLICATIONS

Examination Report pertaining to corresponding Gulf Cooperation Counsel Patent Application No. 2017/34190, dated Sep. 30, 2019.
(Continued)

*Primary Examiner* — Sharon Pregler
(74) *Attorney, Agent, or Firm* — Dinsmore & Shohl LLP (57) ABSTRACT

An asymmetric hollow fiber (CMS) carbon molecular sieve is made by providing a dope solution comprised of a polvimide and a solvent, at a temperature greater than 250° C. that is less than the storage modulus at a temperature of 250° C., but no more than ten times less as measured using dynamic mechanical thermal analysis from 250° C. to a temperature where the polyimide carbonizes. The polvimide
(Continued)

is shaped into a hollow polyimide fiber, the solvent removed and the polyimide hollow fiber is heated to pyrolyze the polyimide and form the asymmetric hollow carbon molecular sieve. The asymmetric hollow fiber carbon molecular sieve has a wall that is defined by an inner surface and outer surface of said fiber and the wall has an inner porous support region extending from the inner surface to an outer microporous separation region that extends from the inner porous support region to the outer surface. Surprisingly, when the polyimide has the particular storage modulus characteristics, the method allows for the hollow fiber CMS to be made without any pre-treatmenis or additives to inhibit stractural collapse of the inner microporous region.

15 Claims, 4 Drawing Sheets

(51) Int. Cl.
| | |
|---|---|
| *B01D 69/02* | (2006.01) |
| *B01D 69/08* | (2006.01) |
| *B01D 71/02* | (2006.01) |
| *C08G 73/10* | (2006.01) |
| *B01D 71/64* | (2006.01) |

(52) U.S. Cl.
CPC ......... *B01D 67/0013* (2013.01); *B01D 69/02* (2013.01); *B01D 69/08* (2013.01); *B01D 69/087* (2013.01); *B01D 71/021* (2013.01); *B01D 71/64* (2013.01); *C08G 73/1039* (2013.01); *C08G 73/1042* (2013.01); *C08G 73/1067* (2013.01); *B01D 2053/224* (2013.01); *B01D 2256/12* (2013.01); *B01D 2256/16* (2013.01); *B01D 2256/24* (2013.01); *B01D 2257/304* (2013.01); *B01D 2257/504* (2013.01); *B01D 2257/7022* (2013.01); *B01D 2323/22* (2013.01); *B01D 2325/04* (2013.01); *B01D 2325/34* (2013.01); *Y02C 20/20* (2013.01); *Y02C 20/40* (2020.08)

(58) Field of Classification Search
CPC ........ B01D 2257/304; B01D 2257/504; B01D 2257/7022; B01D 2323/22; B01D 2325/04; B01D 2325/34; B01D 53/228; B01D 67/0009; B01D 67/0013; B01D 69/02; C08G 73/1039; C08G 73/1042; C08G 73/1067
See application file for complete search history.

(56) References Cited

U.S. PATENT DOCUMENTS

| | | |
|---|---|---|
| RE30,351 E | 7/1980 | Hoehn et al. |
| 4,378,324 A | 3/1983 | Hiroshi et al. |
| 4,460,526 A | 7/1984 | Makino et al. |
| 4,474,662 A | 10/1984 | Makino et al. |
| 4,485,056 A | 11/1984 | Hiroshi et al. |
| 4,512,893 A | 4/1985 | Hiroshi et al. |
| 4,705,540 A | 11/1987 | Hayes |
| 4,717,394 A | 1/1988 | Hayes |
| 4,867,934 A | 9/1989 | Repetti et al. |
| 4,983,191 A | 1/1991 | Ekiner et al. |
| 5,085,774 A | 2/1992 | Ekiner et al. |
| 5,288,304 A | 2/1994 | Koros et al. |
| 5,820,659 A | 10/1998 | Ekiner et al. |
| 6,565,631 B2 | 5/2003 | Koros et al. |
| 9,211,504 B2 | 12/2015 | Bhuwania et al. |
| 9,346,011 B2 * | 5/2016 | Koros ................. B01D 53/228 |
| 10,150,840 B2 | 12/2018 | Xu |
| 10,159,943 B2 * | 12/2018 | Takeuchi ................. D01F 9/22 |
| 2018/0369761 A1 | 12/2018 | Hessler et al. |

FOREIGN PATENT DOCUMENTS

| | | |
|---|---|---|
| WO | 2015100161 A1 | 7/2015 |
| WO | 2015100165 A1 | 7/2015 |
| WO | 2016048612 A1 | 3/2016 |

OTHER PUBLICATIONS

Bhuwania et al., "Engineering Substructure Morphology of Asymmetric Carbon Molecular Sieve Hollow Fiber Membranes", Carbon, 76 (2014), 417-434.
Geiszler et al., "Effects of Polyimide Pyrolysis Atmosphere on Separation Performance of Carbon Molecular Sieve Membranes", Ind. Eng. Chem. Res., 35, 2999 (1996).
Shao et al., "Casting Solvent Effects on Morphologies, Gas Transport Properties of a Novel 6FDA/PMDA-TMMDA Copolyimide Membrane and its Derived Carbon Membranes", Journal of Membrane Science, 2004, 77-87.
Steel et al., "Investigation of Porosity of Carbon Materials and Related Effects on Gas Separation Properties", Carbon, 41, 253 (2003).
Steel et al., "An Investigation of the Effects of Pyrolysis Parameters on Gas Separation Properties of Carbon Materials", Carbon, 43, 1843 (2005)).
Suda et al., "Gas Permeation Through Micropores of Carbon Molecular Sieve Membranes Derived From Kapton Polyimide", J. Phys. Chem. B, 101, 3988 (1997).
Xu et al., "Matrimid Derived Carbon Molecular Sieve Hollow Fiber Membranes for Ethylene/Ethane Separation", Journal of Membrane Science, 380 (2011), 138-147.
Xu et al., "Olefins-Selective Asymmetric Carbon Molecular Sieve Hollow Fiber Membranes for Hybrid Membrane-Distillation Processes for Olefin/Paraffin Separations", Journal of Membrane Science, 423-424 (2012) 314-323.
International Search Report and Written Opinion pertianing to PCT/US2017/053153, dated Jan. 8, 2018.

* cited by examiner

METHOD TO MAKE CARBON MOLECULAR SIEVE HOLLOW FIBER MEMBRANES

FIELD OF THE INVENTION

The invention relates to carbon molecular sieve (CMS) membranes for use in gas separation. In particular the invention relates to a method for producing CMS membranes from particular polyimides.

BACKGROUND OF THE INVENTION

Membranes are widely used for the separation of gases and liquids, including for example, separating acid gases, such as $CO_2$ and WS from natural gas, and the removal of $O_2$ from air. Gas transport through such membranes is commonly modeled by the sorption-diffusion mechanism. Currently, polymeric membranes are well studied and widely available for gaseous separations due to easy process-ability and low cost. CMS membranes, however, have been shown to have attractive separation performance properties exceeding that of polymeric membranes.

Polyimides have been pyrolyzed to form CMS membranes under many differing conditions. U.S. Pat. No. 6,565,631 discloses pyrolyzing under vacuum and inert gases with trace amounts of oxygen. Other patents describe processes for producing carbon membranes (both asymmetric hollow "filamentary" and flat sheets), and applications for gas separation, include, for example, U.S. Pat. No. 5,288,304, and EP Patent No. 0459623. Steel and Koros performed a detailed investigation of the impact of pyrolysis temperature, thermal soak time, and polymer composition on the performance of carbon membranes. (K. M. Steel and W. J. Koros, *Investigation of Porosity of Carbon Materials and Related Effects on Gas Separation Properties, Carbon*, 41, 253 (2003); K. M. Steel and W. J. Koros, *An Investigation of the Effects of Pyrolysis Parameters on Gas Separation Properties of Carbon Materials, Carbon*, 43, 1843 (2005)). In these works membranes were, produced in an air atmosphere at 0.03 mm Hg pressure.

The impact of pyrolysis atmosphere has been researched. Suda and Haraya disclosed the formation of CMS membranes under different environments. (H. Suda and K. Haraya, *Gas Permeation Through Micropores of Carbon Molecular Sieve Membranes Derived From Kapton Polyimide, J. Phys. Chem. B*, 101, 3988 (1997).) Geiszler and Koros disclosed the results of CMS fibers produced from pyrolysis of fluorinated polyimide in helium and argon for both $O_2/N_2$ and $H_2/N_2$ separations. (V. C. Geiszler and W. J. Koros, *Effects of Polyimide Pyrolysis Atmosphere on Separation Performance of Carbon Molecular Sieve Membranes, Ind. Eng. Chem. Res.*, 35, 2999 (1996)).

When making asymmetric hollow fibers CMS membranes from polyimides, which have a thin dense separating layer and thick inner porous support structure, it has been difficult to make the hollow fibers without having undesired structural collapse. Structural collapse results in an undesired thicker separating layer resulting in poor permeance of desired permeate gases rendering the fibers commercially impractical. (see L. Xu, et al. *Journal of Membrane Science*, 380 (2011), 138-147).

To address this problem, complicated involved methods have been described such as in U.S. Pat. No. 9,211,504. In this patent, the application of a sol-gel silica that undergoes vinyl cross-linking on the inner porous walls of the polyimide is described to reduce the structural collapse during pyrolysis to form the hollow fiber CMS membrane. Recently, WO/2016/048612 describes a separate particular preoxidation of particular polyimides, such as 6FDA/BPDA-DAM, having the stoichiometry shown in Formula 1. Formula 1 shows a chemical structure for 6FDA/BPDA-DAM where X and Y are each 1 so as to provide a 1:1 ratio.

Formula 1

This polyimide after undergoing the pre-oxidation was reported to improve the structural collapse and reduce sticking of the fibers during and after pyrolysis.

It would be desirable to provide a method to make a polyimide membrane that avoids any one of the problems mentioned above. In particular, it would be desirable to provide a method that did not involve any further process steps involving heat-treatments or treatments prior to pyrolysis of the polyimide membrane to form the carbon molecular sieve membrane.

SUMMARY OF THE INVENTION

A first aspect of the invention is a method of making an asymmetric hollow fiber carbon molecular sieve comprising,
  (i) providing a dope solution comprised of a polyimide and a solvent, wherein the polyimide has a storage modulus minimum at a temperature greater than 250° C. that is less than the storage modulus at a temperature of 250° C., but no more than ten times less measured using dynamic mechanical thermal analysis from 250° C. to a temperature where the polyimide carbonizes, 1.0 (ii) shaping the dope solution to form a hollow fiber;
  (iii) removing the solvent from the hollow fiber to form a polyimide hollow fiber; and
  (iv) heating the polyimide hollow fiber in an atmosphere that is non-oxidizing to form the asymmetric hollow fiber carbon molecular sieve.

The method of the invention allows the realization of a CMS asymmetric membrane that has reduced or no structural collapse, which can result in improved combinations of selectivity and permeability for desired gas pairs. Illustratively, the method allows for CMS membrane having good selectivity for similar sized gas molecules (e.g., hydrogen/ ethylene; ethylene/ethane; propylene/propane and butylene/butane) while still having higher permeance of the target permeate gas molecule (e.g., hydrogen in gases containing hydrogen/ethylene). That is, the selectivity/permeance characteristics (productivity) are substantially improved relative to CMS asymmetric hollow fiber membranes made using polyimides that do not display the storage modulus behavior above 250° C.

A second aspect of this invention is a process for separating a gas molecule from a gas feed comprised of the gas molecule and at least one other gas molecule comprising
(i) providing the hollow fiber carbon molecular sieve produced by the method of the first aspect; and
(ii) flowing the gas feed through said asymmetric hollow fiber carbon molecular sieve to produce a first stream having an increased concentration of the gas molecule and a second stream having an increased concentration of the other gas molecule.

A third aspect is a gas separating module comprising a sealable enclosure comprised of: a plurality of asymmetric hollow fiber carbon molecular sieves, comprising at least one asymmetric hollow fiber carbon molecular sieve of the first aspect, contained within the sealable enclosure; an inlet for introducing a gas feed comprised of at least two differing gas molecules; a first outlet for permitting egress of a permeate gas stream; and a second outlet for egress of a retentate gas stream.

The gas separation method is particularly useful for separating gas molecules in gas feeds that have very similar molecular sizes such as ethane/ethylene and propane/propylene. It may also be used to separate gases from atmospheric air such as oxygen or separating gases (e.g., methane) in natural gas feeds.

BRIEF DESCRIPTION OF THE DRAWINGS

FIG. 2.a is a scanning electron micrograph of a polymeric hollow fiber made by the method of this invention.

FIG. 2b is a scanning electron micrograph of the corresponding carbon molecular sieve fiber made from the polymeric fiber of FIG. 2a.

FIG. 3b is a scanning electron micrograph of the of the corresponding carbon molecular sieve fiber made from the polymeric fiber of FIG. 3a.

FIG. 4b is a scanning electron micrograph of the corresponding carbon molecular sieve fiber made from the polymeric fiber of FIG. 4a.

DETAILED DESCRIPTION OF THE INVENTION

The asymmetric hollow fiber carbon molecular sieve (hollow fiber CMS) is formed from a polyimide hollow fiber having a thin dense layer on the outer surface of the fiber and a thicker porous support layer on the inner surface of the fiber. Desirably, the hollow fibers are substantially defect-free. "Defect-free" is determined to be when the selectivity of a gas pair, typically oxygen ($O_2$) and nitrogen ($N_2$), through a hollow fiber membrane is at least 90 percent of the selectivity for the same gas pair through a dense film so prepared from the same composition as that used to make the polymeric precursor hollow fiber membrane.

When making the polyimide hollow fiber, conventional procedures known in the art may be used (see, for example U.S. Pat. Nos. 5,820,659; 5,085,774; 4,127,625; 4,867,934; 4,113,628; 4,378,324; 4,460,526; 4,474,662; 4,485,056; 4,512,893 and 4,717,394). Exemplary methods include coextrusion procedures such as a dry-jet/wet-quench spinning process (in which an air gap exists between the tip of the spinneret and the coagulation or quench bath) or a wet spinning process (with zero air-gap distance) may be used to make the hollow fibers.

To make the polyimide hollow fiber, a dope solution is prepared for the spinning process where the dope solution is comprised of a polyimide and solvents. When making a hollow fiber, typically the dope solution is a mixture of solvents that solubilize the polyimide and a second solvent that does not solubilize (or solubilizes to a limited extent) the polyimide, but is soluble with the solvent that solubilizes the polyimide are used. Exemplary solvents that are useful to solubilize the polyimide include polar aprotic solvents such as N-Methyl-2-pyrrolidone (NMP), tetrahydrofuran (THE), dimethylacetamide (DMAc) and dimethylformamide (DMF). Exemplary solvents that do not solubilize the polyimide, but are soluble with the solvents that do solubilize the polyimide include methanol, ethanol, water, and 1-propanol. To facilitate the practical formation of the hollow fiber, generally, the polyimide needs to be dissolved in an amount of at least about 10% to 40%© by weight of the dope solution. Desirably the amount of polyimide solubilized is at least 12%, 15%, 18% or 20%. Such dope solution consists of both non-volatile solvents (e.g., NMP) and volatile solvents (e.g., THE and ethanol). The evaporation of the volatile solvents (boiling point <100° C.) in the air gap promotes the formation of a dense skin layer on the outer surface of the fiber and thus creates the asymmetric fiber structure.

The polyimide may be any polyimide that has a storage modulus minimum at a temperature greater than 250° C. that is less than the storage modulus at a temperature of 250° C., but no more than ten times less measured using dynamic mechanical thermal analysis from 250° C. to a temperature where the polyimide carbonizes. Without being bound in any way, the storage modulus minimum above 250° C. may be or could be correlated or attributed with the polyimide undergoing glass transition or the like prior to carbonizing. The temperature where the polyimide carbonizes (temperature where the polyimide starts to so decompose and form carbon in a non-oxidizing atmosphere) may vary, but in general the temperature is above 400° C. and inevitably will carbonize at a temperature at or above 500° C. or 550° C. The polyimide preferably is a thermoplastic.

The dynamic mechanical thermal analysis is performed using a thin film sample of the polyimide having general dimensions that are 15 ram long, 5 mm wide, and 0.022 mm thick. The samples are kept under $N_2$ purge during the measurements. The films are first heated to 250° C. and equilibrated at this temperature for 15 minutes. Thereafter temperature is ramped to 535° C. at the rate of 4° C./minute, and finally to 550° C. at the rate of 0.25° C./minute. The oscillation frequency is set at 6.28 rad/s and the strain amplitude is set at 0.1%, An exemplary dynamic mechanical thermal analyzer that may be used is RSA III rheometer from TA Instruments, New Castle, Del.

Generally, polyimides having the storage modulus characteristic described above are aromatic polyimides. Aromatic polyimides that may be useful are described by U.S.

Pat. No. 4,983,191 from col. 2, line 65 to col. 5, line 28. Other aromatic polyimides that may be useful are described by U.S. Pat. Nos. 4,717,394; 4,705,540; and re30351. Desirable aromatic polyimides typically are a reaction product of a dianhydride and a diamine, which is understood to proceed by forming a polyamic acid intermediate that is subsequently ring-closed to form the polyimide by chemical and/or thermal dehydration. Preferably, the dianhydride is comprised of a dianhydride having no rotational freedom within the dianhydride, which means that there are no single bonds between aromatic moieties, which would allow the aromatic rings to rotate in relation to each other. In another embodiment, each of the dianhydrides used to make the polyimide has no rotational freedom. In another embodiment, the dianhydride is a combination of dianhydrides that have and do not have rotational freedom. Examples of dianhydrides having no rotational freedom include pyromellitic dianhydride (PMDA) and 1,4,5,8-naphthalene tetracarboxylic dianhydride (NTDA). Examples of a dianhydride having rotational freedom include benzophenone-3,3',4,4'-tetracarboxyiic dianhydride (BTDA), 5,5'-[2,2,2-trifluoro-1-(trifluoromethyl)ethylidene]-1,3-isobenzofurandione (6FDA) and 3,3',4,4'-biphenyl tetracarboxylic dianhydride (BPDA). Combinations of aromatic dianhydrides are contemplated.

The diamine used to make the polyimide may have rotational freedom or not. In a particular embodiment, the diamine is comprised of diamines having rotational freedom and diamines not having rotational freedom (diamines having a single aromatic ring are included in those diamines that have no rotational freedom in the same manner as described so for the dianhydrides above). It is desirable for the diamine to have no rotational freedom and, in particular, the aromatic diamine has only one aromatic ring. Examples of diamines having no rotational freedom include 2,4,6-trimethyl-1,3-phenylenediamine (DAM), 3,5-diaminobenzoic acid (DABA), 2,3,5,6-tetramethyl-1,4-phenylenediamine (durene), dimethyl-3,7-diaminodiphenyl-thiophene-5,5'-dioxide (DDBT), meta-phenylenediamine (m-PDA), para-phenylenediamine, and 2,4-diaminotoluene (2,4-DAT). Examples of diamines having rotational freedom include 4,4'-oxydianiline (ODA), tetramethyimethylenedianiline (TMMDA), and 4,4'-diamino 2,2'-biphenyl disulfonic acid (BDSA).

In a particular embodiment, the polyimide is the reaction product of a so combination of dianhydrides with some having rotational freedom and some not having rotational freedom and a diamine having no rotational freedom and in particular an aromatic diamine that has only one aromatic ring. A particular embodiment of such a polyimide is exemplified by the polyimide 6FDA/PMDA-DAM as represented in below Formula 2:

repeat units and n may be any value to realize the weight average molecular weight described herein. Desirably, Y is from 0.25, 0.3 or 0.4 to 0.9, 0.8 or 0.75. Each of the monomers used to make 6FDA/PMDA-DAM is commercially available for example from Sigma-Aldrich Co. LLC, St. Louis, Mo. or TCI America, Portland, Oreg.

Generally, the polyimide has a molecular weight sufficient to form a polyimide fiber having the requisite strength to be handled and subsequently pyrolyzed, but not so high that it becomes impractical to dissolve to make a dope solution able to form the hollow fiber. Typically, the weight average ($M_w$) molecular weight of the polyimide is 30 to 200 kDa, but desirably the molecular weight of 40 to 70 kDa. Polymer molecular weight may be controlled by stoichiometry of dianhydride to diamine monomers, monomer purity, as well as use of monofunctional endcapping agents such as monoamines (i.e., aniline, 3-ethynylaniline) and monoanhydrides (i.e., phthalic anhydride, succinic anhydride, maleic anhydride).

After the dope solution is formed, the solution is shaped into a hollow fiber as described above. After shaping, the solvents may be exchanged with other solvents (such as methanol and hexane) to prevent, for example, pore collapse, and the solvents are further removed by any convenient method such as application of heat, vacuum, flowing gases or combination thereof and include those known in the art.

After removing the solvent, the formed hollow polyimide fiber is pyrolyzed to form the asymmetric hollow fiber carbon molecular sieve. The hollow polyimide fibers may be pyrolyzed under various inert gas purge or vacuum conditions, preferably under inert gas purge conditions, for the vacuum pyrolysis, preferably at low pressures (e.g., less than 0.1 millibar). U.S. Pat. No. 6,565,631 and U.S. provisional application 62/310,836 describe a suitable heating method for pyrolysis of the polyimide fibers to form the CMS hollow fibers, and each is incorporated herein by reference. A pyrolysis temperature of between about 450° C. to about 800° C. may advantageously be used. The pyrolysis temperature may be adjusted in combination with the pyrolysis atmosphere to tune the performance properties of the resulting CMS hollow fiber membrane. For example, the pyrolysis temperature may be 1000° C. or more. Optionally, the pyrolysis temperature is maintained between about 500° C. and about 550° C. The pyrolysis soak time (i.e., the duration of time at the pyrolysis temperature) may vary (and may include no soak time) but advantageously is between about 1 hour to about 10 hours, alternatively from about 2 hours to about 8 hours, alternatively from about 4 hours to about 6 hours. An exemplary heating protocol may include starting at a first set point of about 70° C., then heating to a second set point of about 250° C. at a rate of about 13.3° C. per minute, then heating to a third set point of about 535° C. at a rate of about 3.85° C. per minute, and then a fourth set point of about 550° C. at a rate of about 0.25° C. per minute.

where X and Y represent the mole fraction of each dianhydride used to make the polyimide with X and Y adding up to 1 and n represents an integer representing the number of The fourth set point is then optionally maintained for the determined soak time. After the heating cycle is complete, the system is typically allowed to cool while still under vacuum or in a controlled atmosphere.

In one embodiment the pyrolysis utilizes a controlled purge gas atmosphere during pyrolysis in which low levels of oxygen are present in an inert gas. By way of example, an inert gas such as argon is used as the purge gas atmosphere. Other suitable inert gases include, but are not limited to, nitrogen, helium, or any combinations thereof. By using any suitable method such as a valve, the inert gas containing a specific concentration of oxygen may be introduced into the pyrolysis atmosphere. For example, the amount of oxygen in the purge atmosphere may be less than about 50 ppm (parts per million) $O_2/Ar$. Alternatively, the amount of oxygen in the purge atmosphere may be less than 40 ppm $O_2/Ar$. Embodiments include pyrolysis atmospheres with about 8 ppm, 7 ppm, or 4 ppm $O2/Ar$.

After pyrolyzing, the CMS membrane that has formed is cooled to a temperature where no further pyrolysis occurs. Generally, this is a temperature where no decomposition products would be evolved from the precursor polymer and may vary from polymer to polymer. Generally, the temperature is 200° C. or less and typically the temperature is taken as 100° C., 50° C. or essentially typical ambient temperatures (20 to 40° C.). The cooling may be at any useful rate, such as passively cooling (e.g., turning off the power to furnace and allowing to cool naturally). Alternatively, it may be desirable to more rapidly cool such as using known techniques to realize faster cooling such as removing insulation, or using cooling fans or employment of water cooled jackets.

After cooling, the CMS hollow fiber membrane may be subjected to a further treatment, for example, to make the fiber more stable or improve particular permeance/selectivity for particular gases. Such further treatments are described in provisional U.S. application 62/268,556, incorporated herein by reference.

The method enables the formation of an asymmetric hollow fiber carbon molecular sieve CMS that has a wall that is defined by an inner surface and outer surface of said fiber and the wall has an inner porous support region (support layer) extending from the inner surface to an outer microporous region (separation layer) that extends from the inner porous support region to the outer surface. Surprisingly, it has been discovered when the aromatic polyimide has the aforementioned storage modulus characteristic, structural collapse of the inner porous support region may be avoided and the outer microporous separation layer may be tailored to be desirably thin in absence of any pretreatment of the polyimide fiber, for example, as described in PCT Publ. WO/2016/048612 or incorporation of an inorganic gel such as described in U.S. Pat. No. 9,211,504 described previously. Avoidance of structural collapse, generally, means that the corresponding separation layer in the asymmetric polyimide fiber when pyrolyzed to make the hollow fiber CMS, the separation layer in the hollow fiber CMS has a thickness that is within 100%, 75%, 50%, 25%, or 10% of the corresponding separation layer of the polyimide fiber. Illustratively, if the polyimide separation layer is 5 micrometers, the corresponding CMS fiber separation layer thickness may be 10, 8.75, 7.5, 6.25 or 5.5 micrometers. Desirably the CMS separation layer may be essentially (~within 5% or less) the same thickness as the corresponding polyimide separation layer.

Typically, the outer separation layer has a thickness of at most 10% of the wall extending from the inner surface to the outer surface. The outer separation layer typically has a thickness of 0.05 micrometers to 15 micrometers, desirably 0.05 micrometers to 5 micrometers, more desirably 0.05 to 1 micrometer. Herein, microporous shall mean pores <2 nm in diameter; niesoporous shall mean 2-50 nm in diameter and macroporous shall mean >50 nm in diameter. The microstructure of the separation layer in CMS is generally, characterized with microporous pores. The support layer is generally characterized by a microstructure where the pores are microporous, macroporous or both.

The gas permeation properties of a membrane can be determined by gas permeation experiments. Two intrinsic properties have utility in evaluating the separation performance of a membrane material: its "permeability," a measure of the membrane's intrinsic productivity; and its "selectivity," a measure of the membrane's separation efficiency. One typically determines "permeability" in Barrer (1 Barrer=$10^{-30}$ [$cm^3$ (STP) cm]/[$cm^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i \, l}{\Delta p_i}$$

Another term, "permeance", is defined herein as productivity of asymmetric hollow fiber membranes and is typically measured in Gas Permeation Units (GPU) (1 GPU=$10^{-6}$ [$cm^3$ (STP)]/[$cm^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unit less ratio.

$$\alpha_{i/j} = \frac{P_i}{P_l} = \frac{(p_i/l)}{(P_l/l)}$$

In a particular embodiment, the asymmetric hollow CMS membrane produced by the method enables a carbon hollow fiber CMS membrane that has a permeance of at least so 5 CPU for a target gas molecule (permeate) and a selectivity of at least 10. In particular embodiments the permeate/retentate gas molecule pairs may be ethylene/ethane, propylene/propane, butylene/butane, hydrogen/ethylene, methane/carbon dioxide, methane/water, oxygen/nitrogen, or methane/hydrogen sulfide. Illustratively, the feed gas generally is comprised of at least 50% of the permeate gas molecule (e.g., ethylene or propylene) and 25% of the retentate gas molecule (e.g., ethane or propane).

In a particular embodiment the CMS membrane produced has a permeance of at least 5 CPU for propylene (permeate) and a selectivity of at least 20 for propylene/propane. Desirably, in this embodiment the permeance is at least 12, 15 or even 18 CPU for propylene. Likewise, in this embodiment the selectivity is at least 30, 40, 45 or even 50 for propylene/propane. In another particular embodiment, the CMS membrane produced has a permeance of at least 5 CPU for ethylene (permeate) and a selectivity of at least 6 ethylene/ethane. Desirably, in this embodiment the permeance is at least 10, 15, 18 or even 20 CPU for ethylene. Likewise, in this embodiment the selectivity is at least 8, 10 or even 12 for ethylene/ethane. In a further embodiment, the CMS membrane produced has a permeance of at least 5 GPU for butylene (permeate) and a selectivity of at least 5 butylene/butane. Desirably, in this embodiment the permeance is at least 10, 20, 30 or even 40 CPU for butylene. Likewise, in this embodiment the selectivity is at least 10, 15 or even 30 for butylene/butane.

The CMS membranes are particularly suitable for separating gases that are similar in size such as described above, which involves feeding a gas feed containing a desired gas molecule and at least one other gas molecule through the CMS membrane. The flowing of the gas results in a first stream having an increased concentration of the desired gas molecule and, a second stream having an increased concentration of the other gas molecule. The process may be utilized to separate any of the aforementioned gas pairs and in particular is suitable for separating ethylene and ethane or propylene and propylene. When practicing the process, the CMS membrane is desirably fabricated into a module comprising a sealable enclosure comprised of a plurality of carbon molecular sieve membranes that is comprised of at least one carbon molecular sieve membrane produced by the method of the invention that are contained within the sealable enclosure. The sealable enclosure has an inlet for introducing a gas feed comprised of at least two differing gas molecules; a first outlet for permitting egress of a permeate gas stream; and a second outlet for egress of a retentate gas stream.

EXAMPLES

Comparative Example

The CMS of Comparative Example 1 was made using 6FDA:BPDA-DAM (1:1) polymer. The 6FDA:BPDA-DAM was acquired from Akron Polymer Systems, Akron, Ohio Gel permeation chromatography was performed to evaluate the molecular weight. Tosoh TSKgel Alpha-M columns were used with 0.5 mL/min eluent of dimethylformamide (DMF) with 4 g/L lithium nitrate. Waters 2695 separation module/Viscotek TDA 302 interface/Waters 2414 RI detector was used as the detector and was at 40° C. The polymer was dissolved in DMF at 0.25 wt %, and the sample injection volume was 100 μL. Agilent PEO/PEG EasiCal standards was used for calibration. The polymer had a weight average molecular weight ($M_w$) of 83 kDa and polydispersity index (PDI) of 5.2. The polymer was dried under vacuum at 110° C. for 24 hours and then a dope was formed. The dope was made by mixing the 6FDA:BPDA-DAM polymer with solvents and compounds in Table 1 and roll mixed in a Qorpak™ glass bottle sealed with a polytetrafluoroethylene (TEFLON™) cap and a rolling speed of 5 revolutions per minute (rpm) for a period of about 3 weeks to form a homogeneous dope.

TABLE 1

| Comparative Example 1 Dope formulation | | |
|---|---|---|
| Dope Component | weight % | mass (g) |
| Comp. Ex. 1 Polyimide | 25 | 50 |
| NMP | 43 | 86 |
| THF | 10 | 20 |
| EtOH | 22 | 44 |

NMP = N-Methyl-2-pyrrolidone;
THF = Tetrahydrofuran;
EtOH = Ethanol

The homogeneous dope was loaded into a 500 milliliter (mL) syringe pump and allowed to degas overnight by heating the pump to a set point temperature of 50° C. using a heating tape.

Bore fluid (80 wt % NMP and 20 wt % water, based on total bore fluid weight) was loaded into a separate 100 mL syringe pump and then the dope and bore fluid were co-extruded through a spinneret operating at a flow rate of 100 milliliters per hour (mL/hr) for the dope, and 100 mL/hr for the bore fluid, filtering both the bore fluid and the dope in line so between delivery pumps and the spinneret using 40 μm and 2 μm metal filters. The temperature was controlled using thermocouples and heating tape placed on the spinneret, dope filters and dope pump at a set point temperature of 70° C.

After passing through a five centimeter (cm) air gap, the nascent fibers that were formed by the spinneret were quenched in a water bath ((50° C.) and the fibers were allowed to phase separate. The fibers were collected using a 0.32 meter (m) diameter polyethylene drum passing over TEFLON guides and operating at a take-up rate of 5 meters per minute (m/min).

The fibers were cut from the drum and rinsed at least four times in separate water baths over a span of 48 hours. The rinsed fibers in glass containers and effect solvent exchange three times with methanol for 20 minutes and then hexane for 20 minutes before recovering the fibers and drying them under argon purge at a set point temperature of 100° C. for two hours.

Prior to pyrolyzing the fibers, a sample quantity of the above fibers (also known as "precursor fibers") were tested for skin integrity. One or more hollow precursor fibers were potted into inch (0.64 cm) (outside diameter. OD) stainless steel tubing. Each tubing end was connected to a ¼ inch (0.64 cm) stainless steel tee; and each tee was connected to ¼ inch (0.64 cm) female and male NPT tube adapters, which were sealed to NPT connections with epoxy. The membrane modules were tested using a constant pressure permeation system. Argon was used as sweep gas in the permeate side. The flow rate of the combined sweep gas and permeate gas was measured by a Bios Drycal flowmeter, while the composition was measured by gas chromatography. The flow rate and composition were then used for calculating gas permeance. The selectivity of each gas pair as a ratio of the individual gas permeance was calculated. The mixed gas feed used for precursor defect-free property examination was 10 mol % $CO_2$/90 mol % $N_2$. The permeation unit was maintained at 35° C., and the feed and permeate/sweep pressures were kept at 52 and 2 psig, respectively.

Figure 1:
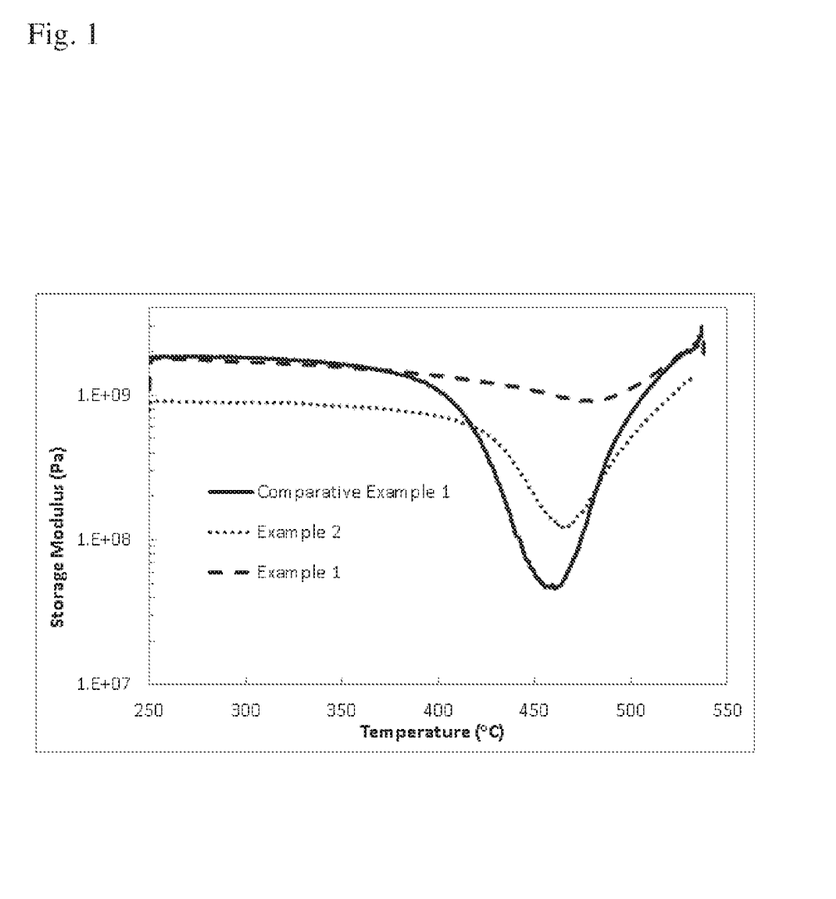
FIG. 1 is a graph of the storage modulus versus temperature of polyimides of Examples and Comparative Examples of the invention.

In addition, the polyimide was cast into a film and cut into pieces of having dimensions that are 15 mm long, 5 mm wide, and 0.0:2:2 mm thick and dynamic mechanical thermal analysis was performed on the film as follows. DMTA was carried out on the polyimide films in tension mode using a RSA III rheometer from TA Instruments. The films were kept under a $N_2$ purge during the measurements. The films were first heated to 250° C. and equilibrated at this temperature for 15 minutes. Thereafter temperature was ramped to 535° C. at the rate of 4° C./minute, and finally to 550° C. at the rate of 0.25° C./minute. The oscillation frequency was set at 6.28 rad/s and strain amplitude at 0.1%. The results of the DMTA tests are shown in FIG. 1 and in Table 3.

The hollow fibers were pyrolyzed to form the CMS membranes by placing the precursor fibers on a stainless steel wire mesh plate each of them bound separately to the plate using stainless steel wire or in a bundle containing multiple hollow fibers contacting each other. The combination of hollow fibers and mesh plate were placed into a quartz tube that sits in a tube furnace. The fibers were pyrolyzed under an inert gas (argon flowing at a rate of 200 standard cubic centimeters per minute (sccm)). Prior to pyrolyzing the furnace was purged of oxygen by evacuating and then purging the tube furnace for a minimum of six hours to reduce the oxygen level to less than 5 ppm. All of the fibers were preheated to 70° C. at a ramp rate of 2° C./min, then heated to 250° C. at a ramp rate of 13.3° C./min, followed by heating to 535° C. at a ramp rate of 3.85° C./min, and to 550° C. at 0.25° C./min, finally soak at 550° C. for 2 hours. After the soak time, the furnace was shut off, cooled under the flowing argon (passively cooled), which typically cooled in about 4 to 6 hours.

Figure 3A:
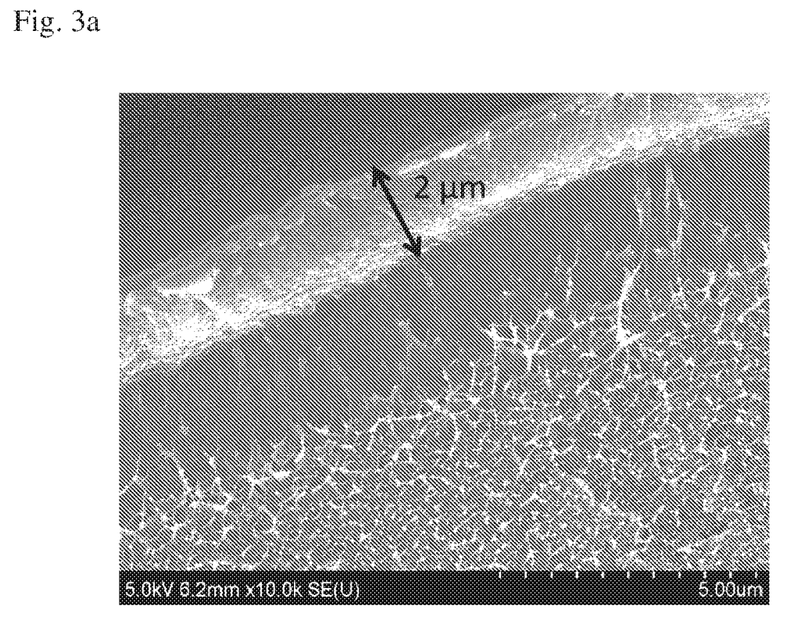
FIG. 3a is a scanning electron micrograph of a polymeric hollow fiber not made by the method of this invention.
Figure 3B:
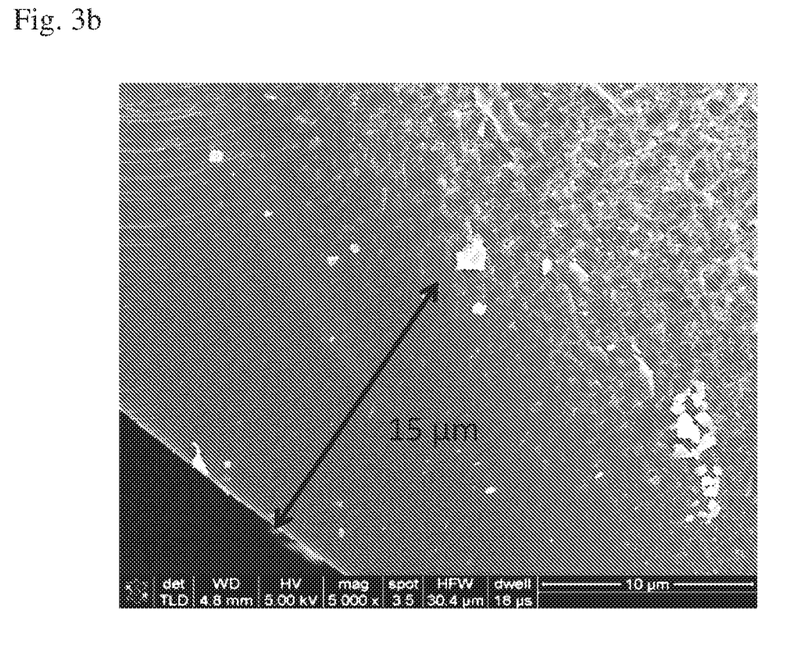

After cooling the fibers were left to sit under the inert gas stream for 24 hours to allow the newly formed CMS to stabilize. The fibers after pyrolysis were stuck together and had to be carefully separated prior to any gas separation testing. The asymmetric polyimide hollow fiber prior to pyrolyzing and after pyrolyzing to form the asymmetric hollow fiber CMS are shown in FIGS. 3*a* and 3*b* scanning electron micrographs. From the micrograph it is readily apparent that the separation layer of the CMS hollow fiber is substantially greater than the separation of the corresponding polyimide layer indicating significant collapse of the porous support structure.

For module making and permeation tests, the fibers that were separated on the mesh prior to pyrolysis were used. Afterwards they were removed from the furnace and potted into modules as described above. The modules were allowed at least 2 hours to set before being loaded into the permeation testing system for initial tests. All permeation tests were determined using a 50:50 mixture of propylene and propane, or ethylene and ethane, or hydrogen and ethylene in a constant pressure system described above with 52 psig upstream and downstream at 2 psig argon purge at 35° C. The stage cut was maintained at less than so 1%. For stable performance, the membranes were allowed to sit in the lab for at least 3 months and tested for stable performance. For each test, the permeation was run multiple hours and most of time more than 20 hours. The permeance and selectivity results are shown in Table 4.

Example 1

A 6FDA/PMDA-DAM polyimide having a mole ratio of 6FDA/PMDA of ⅓ (25%/75%) was made as follows. Into a 3 neck 2 L flask with a slow N2 sweep, 611 grams of 1-methyl-2-pyrrolidinone (611 grams), toluene (50 mL) were loaded and stirred with a magnetic stirring bar. Toluene was distilled from the mixture into a Dean-Stark type trap and drained. The apparatus was cooled to room temperature while stirring. The Dean-Stark type trap was removed and the flask was placed under positive N2. Vacuum sublimed pyromellitic dianhydride (40.887 grams, 0.18745 mol), vacuum sublimed 4,4'-(hexafluoroisopropylidene)diphthalic anhydride (27.751 grams, 62.468 mmol), vacuum sublimed maleic anhydride (0.574 gram, 5.85 mmol), and 2,4,6-trimethyl-m-phenylene diamine (37.976 grams, 0.25280 mol) were added to the flask with 10 mL of dry 1-methyl-2-pyrrolidinone used to rinse down monomers. After ~44 hours reacting under overhead stirring, the inherent viscosity of polyamic acid was 0.73 dL/g (0.1064 g/dL, 30.0° C., 1-methyl-2-pyrrolidinone). To the stirred polyamic acid solution dry 3-picoline (25.8 mL) was injected with a solution of 1-methyl-2-pyrrolidinone (226 mL) and acetic anhydride (226 mL) added dropwise over ~2 hours with stirring continuing overnight. The polyimide product was isolated by precipitation in stirred methanol (~6 L) with polyimide being collected by filtration and subsequently washed four times with fresh methanol. The polyimide, product was dried to a constant weight in a ~100° C. vacuum oven with a recovered yield of 94 grams. Inherent viscosity of the polyimide was 0.75 dL/g (0.1044 g/dL, 30.0° C., 1-methyl-2-pyrrolidinone). Using the same GPC conditions, the polymer Mw was found to be 46.7 kDa and PDI was 3.0.

TABLE 2

Example 1 Dope formulation

| Dope Component | wt % | mass (g) |
| --- | --- | --- |
| Example 1 Polyimide | 25 | 50 |
| NMP | 58 | 116 |
| THF | 10 | 20 |
| EtOH | 7 | 14 |
| Total | 100 | 200 |

Figure 2A:
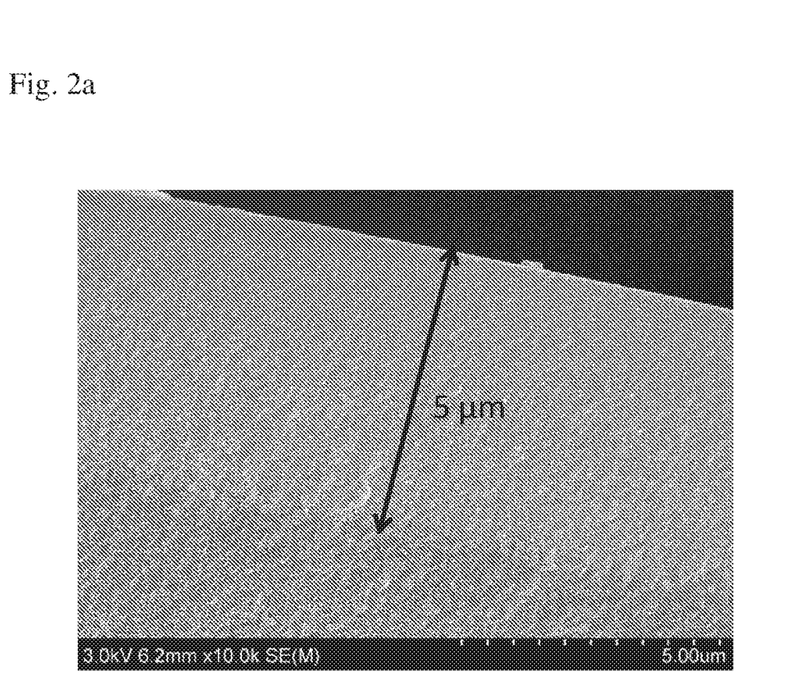
Figure 2B:
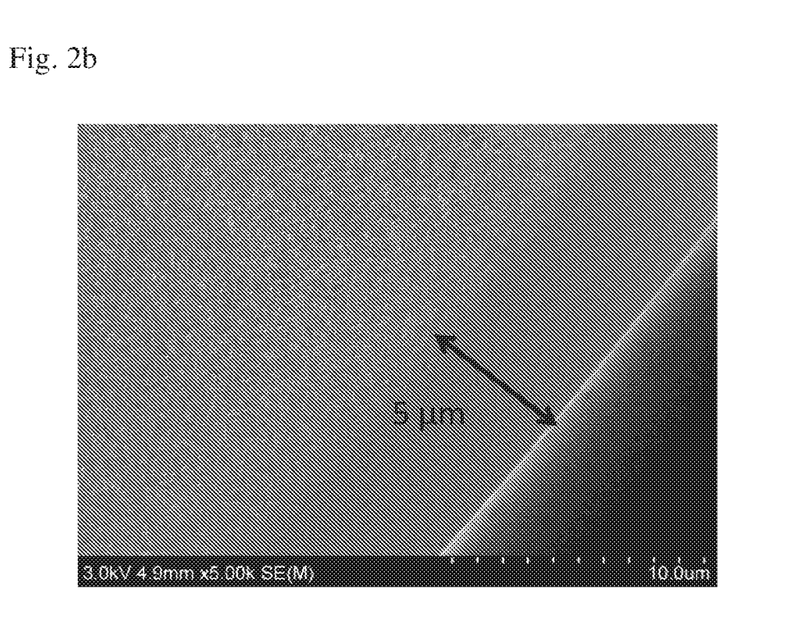

The polyimide of this example was formed into hollow fibers as described in Comparative Example 1 except that the dope composition was as shown in Table 2 and the following differences. The dope and bore fluid flow rates were both 100 mL/hr. The spinneret temperature was 70° C., and the quench bath temperature was 28.6° C. The air gap was 15 cm and the take-up rate was 10 m/min. Likewise the polyimide was cast into films and DMTA was performed with the results shown in FIG. 1 and Table 3. After forming the polyimide fibers they were pyrolyzed as described in Comparative Example 1. The fibers had an inner porous support layer that displayed no collapsing of the structure and a distinct separation region of about 5 micrometers as shown in FIG. 2.*b* compared to the corresponding separation region in the polyimide fiber from which it was made (FIG. 2*a*). In addition, the fibers, after being pyrolyzed, did not stick together at all and were easily separated despite being bundled and contacting each other during pyrolysis.

After the fibers were removed from the furnace, they were potted into modules as described above. The membranes were aged for at least 3 months and tested. For each test, the permeation was run multiple times to ensure repeatable stable results and typically were run more than 20 hours. The results are shown in Table 4.

From the results it is readily apparent that the hydrogen and propylene permeance was substantially higher for Example 1 yet the selectivity was at least the same when paired with ethylene and propane respectively.

Example 2 (Polyimide Illustration)

A 6FDA/PMDA-DAM polyimide having a mole ratio of 6FDA/PMDA of 1/1 (50%/50%) was made as follows. Into a 3 neck 100 mL flask with a slow N2 sweep, 43.8 mL of 1-methyl-2-pyrrolidinone, toluene (10 mL) were loaded and stirred with a magnetic stirring bar. Toluene was distilled from the mixture into a Dean-Stark type trap and drained. The apparatus was cooled to room temperature while stirring. The Dean-Stark type trap was removed and the flask was placed under positive N2. Vacuum sublimed pyromellitic dianhydride (1.133 grams, 5.192 mmol), vacuum sublimed 4,4'-(hexafluoroisopropylidene)diphthalic anhydride (27.751 grams, 5.1.92 mmol), and 2,4,6-trimethyl-m-phenylene diamine (1.560 grams, 10.38 mmol) were added to the flask. After ~92 hours reacting under overhead stirring, the inherent viscosity of polyamic acid was 1.06 dL/g, (0.1035 g/dL, 30.0° C., 1-methyl-2-pyrrolidinone). To the stirred polyamic acid solution in injected dry 3-picoline (1.05 mL) with a solution of 1-methyl-2-pyrrolidinone (9.2 mL) and acetic anhydride (9.2 mL) added dropwise over ~2 hours with stirring continuing overnight. The polyimide product was isolated by precipitation in stirred methanol (~250 mL) with polyimide being collected by filtration and subsequently washed three times with fresh methanol. The polyimide product was dried to a constant weight in a ~95° C. vacuum oven with a recovered yield of 94 grains. Inherent viscosity of the polyimide was 0.96 dL/g (0.1044 g/dL, 30.0° C., 1-methyl-2-pyrrolidinone). Likewise the polyimide was cast into films and DMTA was performed with the results shown in FIG. 1 and Table 3. This polyimide is expected to perform in the same manner as the polyimide of Example 1.

Example 3

A first 6FDA/PMDA-DAM polyimide having a mole ratio of 6FDA/PMDA of ⅓ (25%/75%) was made as follows. Into a 3 neck 2 L flask with a slow N2 sweep, 667 grams of 1-methyl-2-pyrrolidinone and toluene (50 mL) were loaded and stirred with a magnetic stirring bar. Toluene was distilled from the mixture into a Dean-Stark type trap and drained. The apparatus was cooled to room temperature while stirring. The Dean-Stark type trap was removed and the flask was placed under positive N2. Vacuum sublimed pyromellitic dianhydride (44.976 grams, 0.20620 mol), vacuum sublimed 4,4' (hexafluoroisopropylidene)diphthalic anhydride (30.526 grams, 68.715 mmol), vacuum sublimed maleic anhydride (0.631 gram, 6.43 mmol), and 2,4,6-trimethyl-m-phenylene diamine (41.774 grams, 0.2'7809 mol) were added to the flask. After ~44 hours reacting under overhead stirring, the inherent viscosity of polyamic acid was 0.94 dL/g (0.1036 g/dL, 30.0° C., 1-methyl-2-pyrrolidinone). To the stirred polyamic acid solution dry 3-picoline (28.4 mL) was injected with a solution of 1-methyl-2-pyrrolidinone (249 mL) and acetic anhydride (249 mL) added dropwise over ~2 hours with stirring continuing 40 hours. The polyimide product was isolated by precipitation in stirred methanol (~8 L) with polyimide being collected by filtration and subsequently washed four times with fresh methanol. The polyimide product was dried to a constant weight in a ~100° C. vacuum oven with a recovered yield of 94 grams. Inherent viscosity of the polyimide was 0.98 dL/g (0.10:24 g/dL, 30.0° C., 1-methyl-2-pyrrolidinone). Using the same GPC condition, the Mw was measured to be 55.2 kDa and PDI was 3.8.

A second 6FDA/PMDA-DAM polyimide having a mole ratio of 6FDA/PMDA of ⅓ (25%/75%) was made as follows. Into a 3 neck 2 L flask with a slow N2 sweep, 667.3 grams of 1-methyl-2-pyrrolidinone and toluene (50 mL) were loaded and so stirred with a magnetic stirring bar. Toluene was distilled from the mixture into a Dean-Stark type trap and drained. The apparatus was cooled to room temperature while stirring. The Dean-Stark type trap was removed and the flask was placed under positive N2. Vacuum sublimed pyromellitic dianhydride (44.803 grams, 0.20540 mol), vacuum sublimed 4,4'-(hexafluoroisopropylidene)diphthalic anhydride (30.416 grams, 68.468 mmol), vacuum sublimed maleic anhydride (0.826 gram, 8.43 mmol), and 2,4,6-trimethyl-m-phenylene diamine (41.774 grams, 0.27809 mol) were added to the flask. After ~44 hours reacting under overhead stirring, the inherent viscosity of polyamic acid was 0.90 dL/g (0.1016 g/dL, 30.0° C., 1-methyl-2-pyrrolidinone). To the stirred polyamic acid solution dry 3-picoline (28.4 mL) was injected with a solution of 1-methyl-2-pyrrolidinone (249 mL) and acetic anhydride (249 mL) added dropwise over ~2 hours with stirring continuing 40 hours. The polyimide product was isolated by precipitation in stirred methanol (~8 L) with polyimide being collected by filtration and subsequently washed four times with fresh methanol. The polyimide product was dried to a constant weight in a 100° C. vacuum oven with a recovered yield of 94 grams. Inherent viscosity of the polyimide was 0.90 dL/g (0.1056 g/dL, 30.0° C., 1-methyl-2-pyrrolidinone). Using the same GPC condition, the Mw was measured to be 40.5 kDa and PDI was 3.3.

The first and second polyimide of this Example 3 were blended in 50/50 wt % to form asymmetric hollow fibers. The blended polyimide of the fiber had an $M_w$ of 47.3 kDa and PDI of 3.9. The polyimide was formed into hollow fibers as described in Example 1 except that the dope composition was as shown in Table 5 and the following noted differences. The dope and bore fluid flow rates are both 100 mL/hr. The spinneret temperature was 50° C., and the quench bath temperature was at 25.5° C. The air gap was 5 cm and take-up rate was 15 m/min.

Figure 4A:
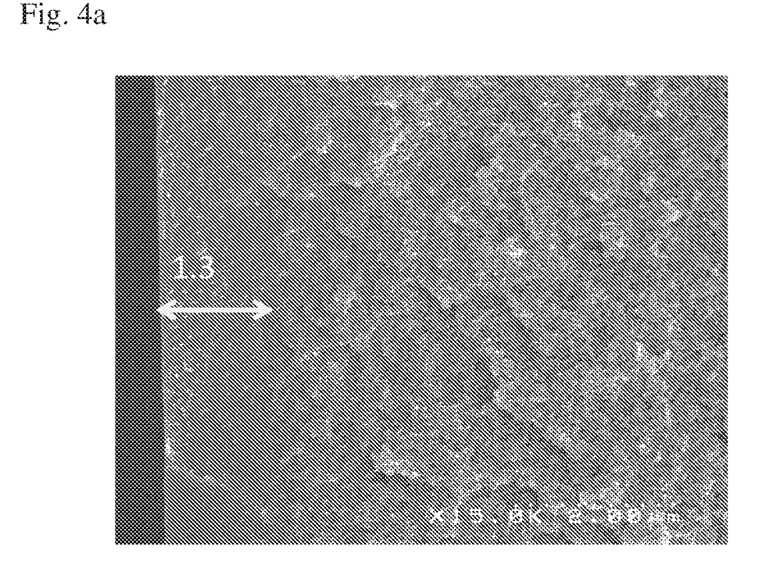
FIG. 4a is a scanning electron micrograph of a polymeric hollow fiber made by the method of this invention.
Figure 4B:
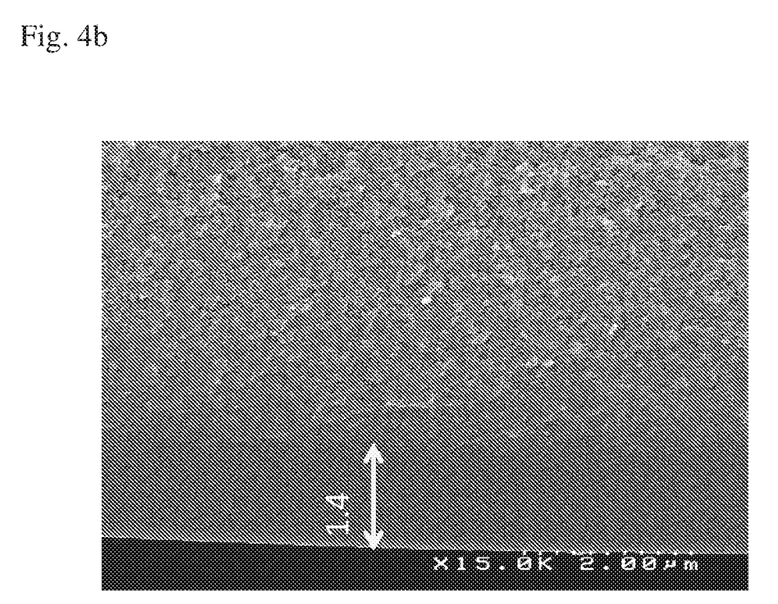

The CMS fibers were obtained by pyrolyzing the polymer fibers as described in Comparative example 1 except for the following differences. The heating protocol was as follows: preheat to 70° C./min, 2° C./min; heat to 250° C./min, 13.3° C./min; heat to 585° C., 3.85° C./min, heat to 600° C., 0.25° C./min; soak at 600° C. for 2 hours. As in Example 1, the hollow CMS fibers were not stuck together and were easily separated. FIGS. 4a and 4b are scanning electron micrographs of the hollow polyimide fiber prior to pyrolyzing and the corresponding CMS fiber made therefrom. From the figures, it can readily be seen that the separation region is essentially the same in both polyimide fiber and the CMS fiber indicating essentially no structural collapse.

TABLE 3

|  | Comparative Example 1 | Example 1 | Example 2 |
| --- | --- | --- | --- |
| Storage modulus at 250° C. (Pa) | $1.83 \times 10^9$ | $1.80 \times 10^9$ | $9.00 \times 10^8$ |
| Minimum storage modulus (Pa) | $4.79 \times 10^7$ | $9.20 \times 10^8$ | $1.24 \times 10^8$ |
| Ratio | 38.2 | 2.0 | 7.3 |

TABLE 4

| | Permeation Results | | | | | |
|---|---|---|---|---|---|---|
| | $C_2H_4/C_2H_6$ Test | | $H_2/C_2H_4$ Test | | $C_3H_6/C_3H_8$ Test | |
| | $C_2H_4$ (GPU) | $\alpha(C_2H_4/C_2H_6)$ | $H_2$ (GPU) | $\alpha(H_2/C_2H_4)$ | $C_3H_6$ (GPU) | $\alpha(C_3H_6/C_3H_8)$ |
| Comparative Ex. 1 | 8.7 ± 0.8 | 5.2 ± 0.1 | 115 ± 35 | 16.3 ± 5.3 | 3.2 ± 0.4 | 25.8 ± 0.4 |
| Example 1 | 8.7 ± 1.2 | 5.2 | 221 ± 18 | 32.5 ± 3.1 | 6.2 ± 1.7 | 26.3 ± 1.6 |

Mixed gas permeation test, 50/50 binary mixture feed, 52 psig feed pressure, 35° C.

TABLE 5

Example 3 Dope formulation

| Dope Component | wt % | mass (g) |
|---|---|---|
| Example 3 $1^{st}$ Polyimide | 10 | 20 |
| Example 3 $2^{nd}$ Polyimide | 10 | 20 |
| NMP | 63 | 126 |
| THF | 10 | 20 |
| EtOH | 7 | 14 |
| Total | 100 | 200 |

What is claimed is:

1. A method of making an asymmetric hollow fiber carbon molecular sieve comprising,
   (i) providing a dope solution comprised of a polyimide and a solvent, wherein
     a storage modulus of the polyimide is measured using dynamic mechanical thermal analysis from 250° C. to a temperature where the polyimide carbonizes,
     a minimum storage modulus of the polyimide measured at any temperature greater than 250° C. is less than the storage modulus of the polyimide measured at 250° C., and
     the minimum storage modulus of the polyimide measured at any temperature greater than 250° C. is at least one tenth of the storage modulus of the polyimide measured at 250° C.,
   (ii) shaping the dope solution to form a hollow fiber;
   (iii) removing the solvent from the hollow fiber to form a polyimide hollow fiber; and
   (iv) heating the polyimide hollow fiber in an atmosphere that is non-oxidizing to form the asymmetric hollow fiber carbon molecular sieve.

2. The method of claim 1, wherein the asymmetric hollow fiber carbon molecular sieve has a wall that is defined by an inner surface and outer surface of said fiber and the wall has an inner porous support region extending from the inner surface to an outer microporous separation region that extends from the inner porous support region to the outer surface and the method is performed in the absence of an inorganic stabilizer to stabilize the inner porous region structural collapse.

3. The method of claim 2, wherein the polyimide hollow fiber is not pretreated to increase the rigidity of the polyimide hollow fiber prior to heating.

4. The method of claim 2, wherein outer microporous separation region has a thickness of 0.05 micrometers to 15 micrometers.

5. The method of claim 1, wherein the minimum storage modulus measured at any temperature greater than 250° C. is at least ten seventy-fifths of the storage modulus measured at 250° C.

6. The method of claim 5, wherein the minimum storage modulus measured at any temperature greater than 250° C. is at least one fifth of the storage modulus measured at 250° C.

7. The method of claim 1, wherein the polyimide is the reaction product of a dianhydride and a diamine.

8. The method of claim 7, wherein the dianhydride is comprised of an aromatic dianhydride that has no rotational freedom within the dianhydride.

9. The method of claim 8, wherein the dianhydride is comprised of the dianhydride that has no rotational freedom within the dianhydride and a diahydride that has rotational freedom within the dianhydride.

10. The method of claim 8, wherein the dianhydride that has no rotational freedom is pyromellitic dianhydride, naphthalenetetracarboxylic dianhydride, benzoquinonetetracarboxylic dianhydride, or combination thereof.

11. The method of claim 1 wherein the polyimide is represented by:

where X is 0.1 to 0.9 and Y is 0.1 to 0.9 and X+Y=1 and n is an integer that may be any that realizes a molecular weight of 30 to 200 kDa.

12. The method of claim 11, wherein X is 0.1 to 0.35 and Y is 0.65 to 0.9.

13. A process for separating a gas molecule from a gas feed comprised of the gas molecule and at least one other gas molecule comprising
   (i) providing the hollow fiber carbon molecular sieve produced by claim 1; and
   (ii) flowing the gas feed through said asymmetric hollow fiber carbon molecular sieve to produce a first stream having an increased concentration of the gas molecule and a second stream having an increased concentration of the other gas molecule.

14. The process of claim 13, wherein the gas molecule and other gas molecule is: hydrogen and ethylene; ethylene and ethane; propylene and propane; oxygen and nitrogen; hydrogen and methane; or carbon dioxide and methane.

15. A gas separating module comprising a sealable enclosure comprised of: a plurality of asymmetric hollow fiber carbon molecular sieves, comprising at least one asymmetric hollow fiber carbon molecular sieve produced by claim 1, contained within the sealable enclosure; an inlet for introducing a gas feed comprised of at least two differing gas molecules; a first outlet for permitting egress of a permeate gas stream; and a second outlet for egress of a retentate gas stream.

* * * * *